(12) United States Patent
Mostert et al.

(10) Patent No.: US 11,452,277 B2
(45) Date of Patent: Sep. 27, 2022

(54) MILKING SYSTEM

(71) Applicant: LELY PATENT N.V., Maassluis (NL)

(72) Inventors: Gerard Mostert, Maassluis (NL); Rik Steenbergen, Maassluis (NL); Frans Emo Diderik Van Halsema, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 313 days.

(21) Appl. No.: 16/467,390

(22) PCT Filed: Nov. 27, 2017

(86) PCT No.: PCT/NL2017/050781
§ 371 (c)(1),
(2) Date: Jun. 6, 2019

(87) PCT Pub. No.: WO2018/111095
PCT Pub. Date: Jun. 21, 2018

(65) Prior Publication Data
US 2020/0084994 A1 Mar. 19, 2020

(30) Foreign Application Priority Data

Dec. 14, 2016 (NL) ...................................... 2017992

(51) Int. Cl.
*A01J 5/01* (2006.01)
*G01F 3/36* (2006.01)

(52) U.S. Cl.
CPC . *A01J 5/01* (2013.01); *G01F 3/36* (2013.01)

(58) Field of Classification Search
CPC .......... A01J 5/01; A01J 5/0133; A01J 5/0135; G01F 3/36
See application file for complete search history.

(56) References Cited

U.S. PATENT DOCUMENTS 3,600,944 A * 8/1971 Hutchings ................. G01F 5/00
73/203
3,919,975 A * 11/1975 Duncan ..................... G01F 3/38
119/14.05
(Continued)

FOREIGN PATENT DOCUMENTS

CN 102334015 A * 1/2012 .......... G01F 23/242
DE 36 09 275 A1 9/1987
(Continued)

OTHER PUBLICATIONS

Valtorc Valves and Actuators: Dribble Ball Valve https://www.valtorc.com/actuation/actuated-valve-packages/dribble-control-ball-valve-specs/ (Year: 2015).*
(Continued)

*Primary Examiner* — Joshua D Huson
*Assistant Examiner* — Megan J Moroney
(74) *Attorney, Agent, or Firm* — Oblon, McClelland, Maier & Neustadt, L.L.P.

(57) ABSTRACT

A milking system for milking a dairy animal includes a milking cup having a first milk outflow opening, a measuring chamber having a milk inlet which is in flow communication with the first milk outflow opening, with a second milk outflow opening to a milk hose, and with a vacuum connection, and a level sensor for measuring a milk level in the measuring chamber. The milking system further includes a controllable valve having an adjustable passage opening, which is provided in or downstream of the second milk outflow opening, and a control unit which is operatively connected to the level sensor and the valve, and which control unit is configured to adjust the passage opening of the valve on the basis of the measured milk level.

22 Claims, 3 Drawing Sheets

(56) References Cited

U.S. PATENT DOCUMENTS

| | | | | |
|---|---|---|---|---|
| 4,112,758 A | * | 9/1978 | Heidecker | A01J 5/01 73/218 |
| 4,170,198 A | * | 10/1979 | Gordon | A01J 5/01 119/14.08 |
| 4,188,910 A | * | 2/1980 | Hocker | A01J 5/01 119/14.08 |
| 4,231,324 A | * | 11/1980 | Schletter | A01J 5/01 119/14.17 |
| 4,306,454 A | * | 12/1981 | Olrik | A01J 5/01 73/224 |
| 4,346,596 A | * | 8/1982 | Diamant | A01J 5/01 73/200 |
| 4,771,007 A | * | 9/1988 | Tippetts | A01J 5/0133 119/14.01 |
| 5,080,040 A | | 1/1992 | van der Lely | |
| 5,083,459 A | * | 1/1992 | Lind | A01J 5/01 73/200 |
| 5,094,112 A | * | 3/1992 | Hoefelmayr | G01F 1/52 119/14.17 |
| 5,218,924 A | * | 6/1993 | Thompson | A01J 5/007 119/14.02 |
| 5,568,788 A | * | 10/1996 | van den Berg | A01J 5/0133 119/14.02 |
| 5,715,856 A | * | 2/1998 | Martin | A01J 5/00 119/14.34 |
| 5,720,236 A | | 2/1998 | Carrano et al. | |
| 5,809,932 A | * | 9/1998 | van den Berg | A01J 5/007 119/14.47 |
| 6,142,098 A | * | 11/2000 | van den Berg | A01J 5/0175 119/14.51 |
| 2002/0156589 A1 | * | 10/2002 | Fematt | A01J 5/01 702/45 |
| 2003/0130808 A1 | * | 7/2003 | Kapitulskiy | G01F 11/284 702/45 |
| 2004/0168644 A1 | | 9/2004 | Lindholm | |
| 2011/0283810 A1 | * | 11/2011 | Hoefelmayr | G01F 13/00 73/861.53 |

FOREIGN PATENT DOCUMENTS

| | | | | |
|---|---|---|---|---|
| DE | 3609275 A1 | * | 9/1987 | A01J 5/007 |
| EP | 0 584 890 A2 | | 3/1994 | |
| EP | 0 784 924 A1 | | 7/1997 | |
| EP | 1 443 324 A1 | | 8/2004 | |
| GB | 2154007 A | * | 8/1985 | A01J 5/01 |
| WO | WO-2008141664 A1 | * | 11/2008 | A01J 5/01 |

OTHER PUBLICATIONS

International Search Report dated Feb. 21, 2018 in PCT/NL2017/050781 filed Nov. 27, 2017.

* cited by examiner

MILKING SYSTEM

BACKGROUND i. Field

The present invention relates to a milking system for milking a dairy animal, and comprising at least one milking cup having a first milk outflow opening, a measuring chamber having a milk inlet which is in flow communication with the first milk outflow opening, with a second milk outflow opening to a milk hose with a controllable valve between them, and with a level sensor for measuring a milk level in the measuring chamber, and a control unit which is operatively connected to the level sensor and the valve.

ii. Related Art

The document DE3609275A1 describes such a system, having a measuring chamber for the milk which is obtained from a teat. At the same rhythm as the pulsation with which the teat is milked, a valve is also opened and closed, as a result of which the milk flows out of the measuring chamber to a collection vessel. From there, the milk passes through to a milk transport line in a float-controlled manner. A milk level is measured in the measuring chamber, so that the milk flow may be determined from the sum per unit time of the volumes of the pulsations of milk emerging from the measuring chamber in the pulsation rhythm.

In practice, it has been found with this system that the measured milk flow is not always accurately measurable, but the known system is also relatively complicated, and not easy to clean. In addition, the milk quality is often unsatisfactory.

SUMMARY

It is an object of the present invention to at least partly eliminate the above-mentioned drawbacks.

The invention achieves this object by means of a milking system as claimed in claim 1, in particular a milking system for milking a dairy animal, and comprising at least one milking cup having a first milk outflow opening, a measuring chamber having a milk inlet which is in flow communication with the first milk outflow opening, with a second milk outflow opening to a milk hose, and with a vacuum connection, a level sensor for measuring a milk level in the measuring chamber, a controllable valve having an adjustable passage opening, which is provided in or downstream of the second milk outflow opening, and a control unit which is operatively connected to the level sensor and the valve, and which is configured to adjust the passage opening of the valve on the basis of the measured milk level.

The invention uses the insight that it is not necessary to collect each pulsation of milk separately, and subsequently direct it into the further milk hose system effectively pulsed to the same degree and thus with on average a greater (peak) speed. Due to the valve and the control unit, the present milking system is able to pass the collected milk through to the milk hose much more regularly. This provides advantages in terms of the milk quality, since this means that it is not necessary to introduce any large and unnecessary decelerations and accelerations of the pulsations of milk in the milk meter, as a result of which peak speeds of the milk are also reduced and, for example, fat globules are damaged to a lesser degree. In this case, the vacuum connection of the measuring chamber is of course situated above the second milk outflow opening, so that air which potentially reaches the measuring chamber is extracted, milk foam bubbles burst and effectively a single-phase system containing only milk remains.

There is also effectively one valve (in this case a float) less compared to the prior art. In addition, it is thus possible to exert more influence on the milk level in the measuring chamber, as a result of which the conditions in the measuring chamber are also more constant. This may be advantageous likewise for the accuracy and reproducibility of measurements in the measuring chamber, such as using external non-invasive or also internal measuring devices.

Particular embodiments are described in the dependent claims and in the following part of the description.

In embodiments, the measuring chamber is directly and rigidly connected to the milking cup, and in particular the milking cup and the measuring chamber form one rigid unit. Advantageously, the first milk flow opening directly adjoins the milk inlet, so that there is no unnecessary connection, such as a hose or the like, between the two, and the properties of the milk, such as temperature, conductivity, fat quality, etc., are affected as little as possible. It is of course possible to flexibly connect the measuring chamber to the first milk outflow opening and/or to the milking cup, for example by providing a flexible connecting piece between the two. This implementation may offer the advantage that the measuring chamber always hangs substantially vertically during milking, which makes the measurement results even more reliable.

In embodiments, the control unit is configured to adjust, in particular continuously adjust, the passage opening between a smallest open position and a largest open position during at least a part of a milking operation, more particularly at least during a main milking phase of the milking operation. It is explicitly pointed out here that the invention in general does not comprise the simple opening and closing of a valve with only an open and closed position. The adjustment according to the invention comprises the setting of at least one other position, advantageously a plurality of positions, with an intermediate value of the cross sectional area, in each case on the basis of the measured milk level value(s). The present embodiment is in this case further specified in that the control unit is configured to vary the valve between open positions of all kinds between a first open position having a smallest passage opening, and a second open position having a largest passage opening. In the simplest embodiment, this could be the only two open positions, but advantageously a plurality of intermediate positions are settable, advantageously even a continuous series of positions. It is thus possible to ensure, for example, that the milk can flow through from the measuring chamber to the milk hose at as low a speed as possible.

It should also be noted here that the adjustment of the position of the valve occurs at least during a part of the milking operation, and in particular during a main milking phase.

In embodiments, the control unit is configured to enlarge the passage opening in the case of a rising milk level and reduce the passage opening in the case of a falling milk level. If the volume of milk in the measuring chamber increases, for example with the position of the valve remaining the same and at the start of the milking operation, thus with increasing milk flow from the teat, the milk level in the measuring chamber could continue to rise. In order to counteract this, the control unit may adjust the position of the valve to a position with a larger passage opening.

In embodiments, the control unit is configured to adjust the passage opening in such a way that the aim is a milk level which remains the same. This is a particular form in which the milk level is controlled as far as possible. In this case "the aim is a milk level which remains the same" is understood to mean that the adjustment adjusts the passage opening of the valve in such a way that not only the outflow from the measuring chamber is increased or reduced, respectively, if the inflow also rises or falls, respectively, which after all caused the higher or lower milk level, respectively, but also more particularly that the milk level in the measuring chamber if possible remains within predetermined limits. In this case, it may be advantageous to make the control loop between the level sensor, the control unit and the valve as fast as possible, or at least as fast as is necessary. The speed depends on the desired stability of the milk level. It should be noted that the control unit may comprise not only a feedback loop, but also, for example, a feedforward loop. Machine learning may also be used in the control unit, for example on the basis of historical values of the milk flow and the progression thereof over time for the dairy animal which is being milked.

In embodiments, the level sensor extends substantially vertically over an internal height of the measuring chamber during milking, and in particular comprises a series of mutually separate electrodes which are electrically connectable via a sensor control unit. Such a sensor system is a simple but effective measuring system, and operates using conductance in the milk in the measuring vessel. The electrodes are each separately connected to a bottom electrode, or alternatively they are alternately connected to one and the same bottom electrode one at a time, and the height is determined in each case by looking at the highest electrode which measures a conductivity below a predetermined threshold. Such a measuring principle is incidentally known per se in the prior art. Alternative level sensors are incidentally not excluded, such as optical sensors, with one or more light sources being arranged on a side of the measuring chamber, and with a series of optical sensors, such as photodiodes, being arranged at different heights on an opposite side and measuring the transmittance.

In particular embodiments, the milking system comprises an inclination sensor for determining an inclination of the milking cup, wherein the control unit is operatively connected to the inclination sensor and is configured to correct the measured milk level on the basis of the determined inclination. If the measuring chamber is at an angle from the vertical after attachment of the milking cup to a teat, it may be that the actual, i.e. vertical milk level does not correspond to the measured milk level. In order to correct this, an inclination sensor may be provided which measures the inclination of at least the measuring chamber, preferably in two directions, such as mutually perpendicular directions. The control unit may then process the measured values with the measured values from the level sensor, in order to reach an actual milk level. It should be noted here that this is particularly advantageous if the measuring chamber is directly and rigidly connected to the milking cup.

In embodiments, the valve is provided in the measuring chamber, in particular in the second milk outflow opening. A very direct control of the milk level is thus possible. Alternatively, the measuring valve is provided further along, seen in the flow direction, in particular in the milk hose, in other words downstream of the passage opening. This offers the advantage that the valve effectively does not hang from the teat during milking, meaning that the milking cup with measuring chamber may remain relatively light. It is also the case that the measuring chamber is then in fact enlarged and also comprises the part of the milk hose between the second milk outflow opening up to the valve. On the one hand this makes the system somewhat more stable, on the other hand this makes it possible to configure the measuring chamber to be smaller, and thus lighter, certainly if the milk hose is, for example, at least partly supported.

In embodiments, the milking system comprises a milk flow meter which is configured to determine the milk flow through the second milk outflow opening on the basis of the passage opening of the valve. In this case, the milk flow meter may also be an integral part of the control unit, such as, for example, a calculation algorithm programmed therein. In the present document, milk flow is understood to mean a flow rate of the milk through the valve, in other words the volume of milk per unit time. The milk flow meter, if it forms a separate part, is operatively connected to at least the control unit. In all cases, the milk flow meter may determine the milk flow from the size of the passage opening, and thus from the set position of the valve, specifically as follows. Each value of the size of the passage opening/valve position is associated with a measured milk level. In addition, there is in principle a fixed, or at least a predetermined pressure difference over the passage opening as a result of the set milk vacuum which (also) prevails in the measuring chamber, and the set transport vacuum which prevails in the milk line system connected to the second milk outflow opening. In the event that one or both pressures are settable, it is advantageous if the control unit receives these values from the milking system. From this pressure difference and the pressure due to the milk level, it is simple to derive, in combination with the size of the passage opening and using calculations from fluid dynamics, the value of the milk flow, at least to a first approximation. The fixed size of the second milk outflow opening and the resistance of the milk hose and the like may then be involved in this. This approximation may be improved by carrying out practical or calibration measurements. For example, the specific form of the valve and a potential flow resistance could be taken into account. Nevertheless, this provides a very simple and accordingly also reliable milk meter.

In particular, the milking system comprises a pressure measuring device configured to measure a pressure difference over the valve and/or the passage opening, more particularly comprising a first pressure sensor configured to measure a pressure in the measuring chamber, and a second pressure sensor to measure a pressure in the milk hose. In this embodiment, the pressure is measured at both sides of the valve, so that the pressure difference may be determined more accurately. It should be noted that it may nevertheless already be advantageous for the milking system as a whole to measure the relevant pressures, for example in order to monitor and adjust the milking process. It thus requires few adjustments to also use these values to better determine the pressure difference, and from this the milk flow.

In particular, the milking system comprises a height determining device configured to determine a milking height at which the measuring chamber is located during milking of the dairy animal, wherein the milk flow meter is operatively connected to the height determining device and is configured to determine the milk flow on the basis of the determined milking height. With this embodiment, it is possible to take into account the fact that the milking cup, and thus the measuring chamber connected thereto, may be attached at different heights in the case of different dairy animals, owing to differences in the build, such as udder height. As the milk is guided through the valve and the milk hose in a constant flow and in particular without admixture of air, a measuring chamber which is higher with respect to the ground will exhibit a greater hydrostatic pressure. In order to be able to take this effect into account in the effective milk flow, the height of the measuring chamber is determined using the height determining device. The control unit may then include this height, in other words the associated hydrostatic pressure of the milk column, in the calculation of the milk flow. Once again, this is possible using pure calculations from fluid dynamics, but also with the aid of calibration measurements. The height determining device itself is not subject to any particular limitations, and may, for example, comprise a vertical series of "electronic eyes" along the height of the dairy animal, a 2D or 3D camera with image processing, or also a database containing teat heights of the dairy animals.

In embodiments, the milking system comprises a milk hose milk flow meter in or around the milk hose for measuring the milk flow, in particular a contactlessly measuring milk hose milk flow meter, more particularly an electrically or electromagnetically operated milk hose milk flow meter, advantageously a magnetohydrodynamic milk hose milk flow meter. Alternatively or in addition to the milk flow meter already mentioned above, a milk hose milk flow meter may also be provided, in other words a milk flow meter which measures the milk flow in the milk hose connected to the second milk outflow opening. Precisely because the milk flow in this milk hose contains no more air or virtually no more air, it is possible to use other, and in particular simpler and/or less expensive meters than for conventional milk flow meters which take measurements from a two-phase milk/air flow. In particular, a contactlessly measuring meter is provided, which can measure the flow without contact with the milk. This offers the advantage that the meter does not need to cause any pressure loss, and cannot be affected by the influence of the milk, such as through the deposition of milk residues. For example, the milk hose milk flow meter is electrically or electromagnetically operated, such as a meter which measures according to the magnetohydrodynamic principle. Of course, other types of meter are also possible, including meters accommodated in the milk hose.

In embodiments, the measuring chamber has a, preferably rounded or round, cross section that increases away from the milk inlet. The form starting from the milk inlet is preferably convex, such as horn-shaped. Due to the Coanda effect, a measuring chamber shaped in such a way ensures that at least the largest portion of the inflowing milk will enter the measuring chamber along the wall. This prevents there being much foam formation in the milk, which in turn may again improve the accuracy of the measurements and also the milk quality.

In embodiments, the milking system comprises an additional sensor for measuring a milk-related property, in particular a sensor for measuring a milk property. Such embodiments offer the advantage that the measurement may be carried out on milk, and not on a milk/air mixture, and also advantageously with a substantially constant milk level. This makes the measurement simpler and more reliable. Advantageously, the additional sensor is located in the measuring chamber, so that the measurement may be carried out in the measuring chamber very close to the teat. However, this is not necessary, and the additional sensor may also be provided for measuring in the milk hose. Examples of such additional sensors are a conductivity, temperature or colour sensor.

In particular, the control unit is configured to control the valve in such a way that the milk level increases if the determined or measured milk flow falls below a threshold value. It is thus possible to ensure that more milk enters the measuring chamber toward the end of a milking operation, as a result of which the milking cup as a whole will become heavier, which may counteract the so-called creeping of the milking cup. In this case, the threshold value may be determined on the basis of animal or historical data, or, for example, as a percentage of the maximum milk flow measured during the milking operation.

BRIEF DESCRIPTION OF THE DRAWINGS

The invention will be explained in more detail below by means of one or more exemplary embodiments and the drawing, in which.

DETAILED DESCRIPTION

Figure 1:
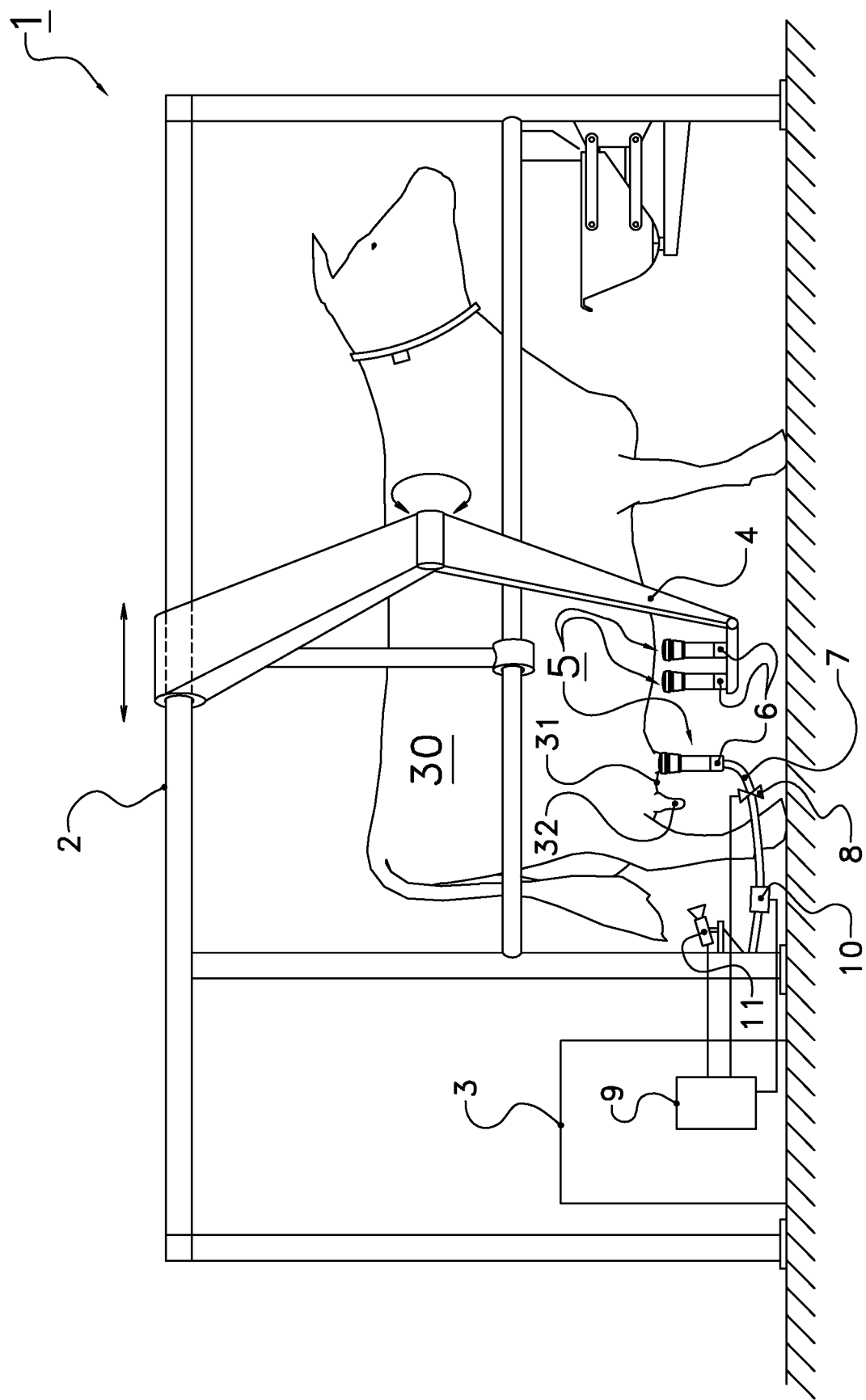
FIG. 1 shows a diagrammatic side view of a milking system according to the invention.

FIG. 1 shows a diagrammatic side view of a milking system 1 according to the invention. The milking system 1 comprises a milking stall 2 with a robot 3 having a robot arm 4, and also a milking cup 5 having a measuring chamber 6 and a milk hose 7 in which there is a valve 8. Reference numeral 9 denotes a control unit and reference numeral 10 denotes a milk hose milk flow meter. Reference numeral 11 denotes a camera.

Furthermore, reference numeral 30 denotes a dairy animal with an udder 31 and teats 32.

The illustrated milking system is a milking robot system, which can attach the milking cups 5 fully automatically to the teats 32 of a dairy animal 30, such as a cow. Nevertheless, the invention can likewise be applied to a conventional milking system, where the milking cups are attached to the teats by hand. In the illustrated robot milking system, parts which are not essentially important to the invention, such as a teat detection system and milk pump, are not shown.

The milking cup 5 comprises a measuring chamber 6 which ends in a milk hose 7. The milk hose 7 can be closed using a valve 8 which is under the control of a control unit 9. The milk hose milk flow meter 10 is arranged on the milk hose 7 downstream of the valve 8 in order to measure the milk flow through the milk hose 7 during milking. This milk hose milk flow meter 10 is connected to the control unit 9, and also to the camera 11. Said camera 11 may serve not only as an aid for determining the position of the dairy animal 30 or the teats 32, but according to the invention in particular for determining a position of the milking cup 5 on the teat 32. Depending on the form of the udder and the teat 32, it may be the case that the milking cup 5 does not hang entirely vertically, but at an angle to the vertical. In addition, the camera 11 may also serve to determine the height of the milking cup 5 and optionally of the valve 8. This height/ these heights may be important in determining the milk flow on the basis of the passage opening of the valve 8. All of this will be explained in more detail with reference to FIG. 2.

Figure 2:
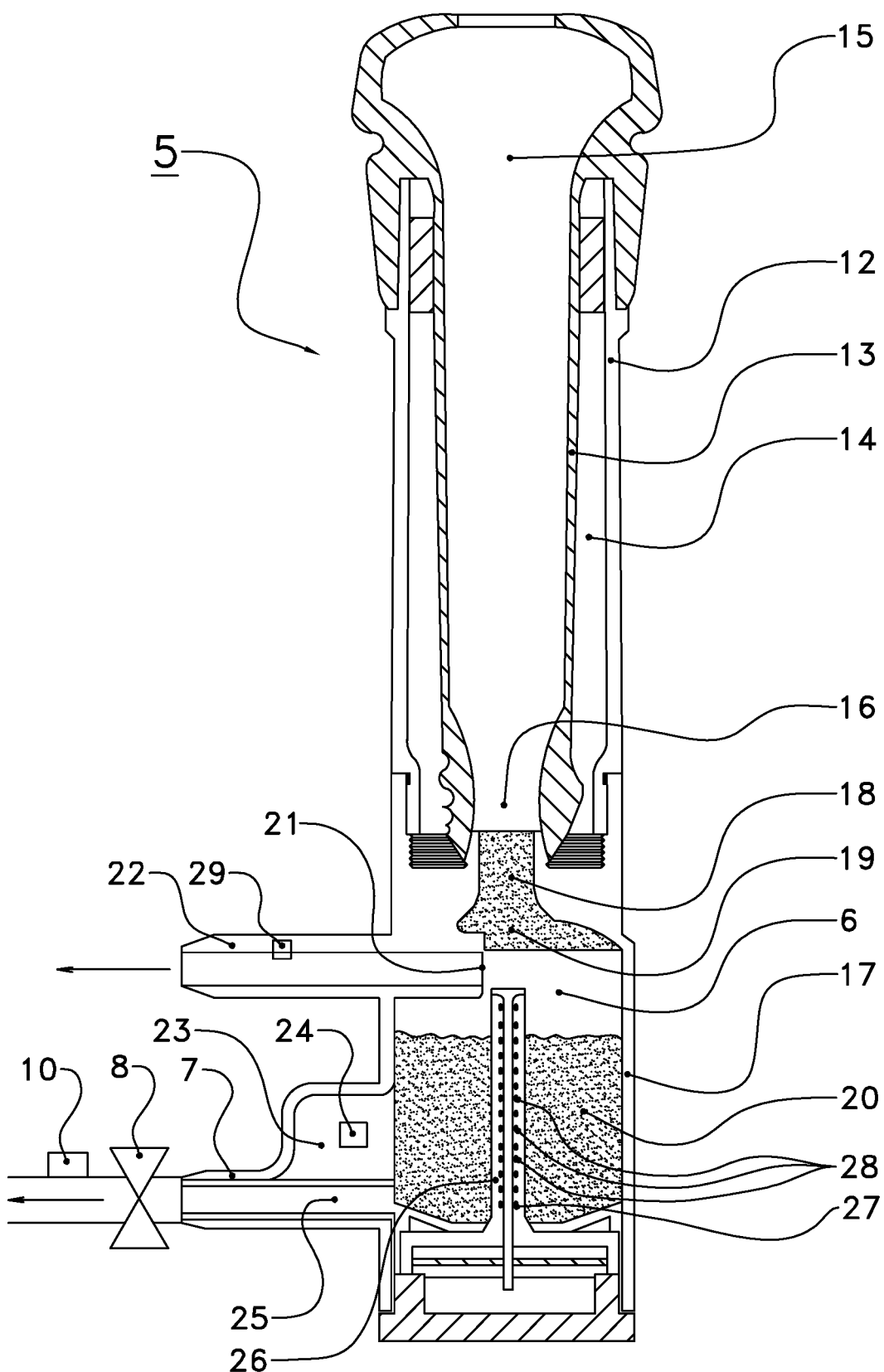
FIG. 2 shows a cross section of part of a milking system according to the invention.

FIG. 2 shows a diagrammatic cross section of part of a milking system according to the present invention. In this figure, similar parts are denoted by the same reference numerals.

The milking cup 5 comprises a cup casing 12 and a lining 13, enclosing a pulsation space 14 between them. In the lining, there is a teat space 15 which ends in a first milk outflow opening 16. A housing 17 for the measuring chamber 6 forms a rigid unit with the milking cup 5. The first milk outflow opening 16 opens (almost) directly into the milk inlet 18 which is connected to the measuring chamber 6 via a convex outflow 19. In this case, there is milk 20 in the measuring chamber 6. Above it, a vacuum line 22 is connected via a vacuum outlet 21. Reference numeral 23 denotes a measurement constricted section, on which is an additional sensor 24. The measurement constricted section 23 ends in the milk hose 7, via the second milk outflow opening 25.

Reference numeral 26 denotes a level sensor which comprises a bottom electrode 27 and electrodes 28. Finally, reference numeral 29 denotes a vacuum sensor.

In embodiments, the milking system according to the invention comprises the illustrated rigid combination of a milking cup 5 and a housing 17 with the measuring chamber 6. The milk obtained from the teat in the teat space 15 flows to the measuring chamber 6 via the first milk outflow opening 16 and the milk inlet 18 directly via the outflow 19. The convex form of the outflow 19 and the resulting Coanda effect means that the incoming milk will for the most part "adhere" to the wall of the housing 17, thus resulting in minimal foaming. Partly as a result thereof, a volume of single-phase milk 20 will in principle be formed at the bottom of the measuring chamber 6, with only air being present in the space above. This air, although it is under a lower than atmospheric pressure, can be extracted via the vacuum outlet 21 and the vacuum line 22, which are connected to a vacuum system of the milking system which is not illustrated in detail here. In principle, the pressure will correspond to a normal milk vacuum, such as around 40 kPa.

The housing 17 of the measuring chamber 6 and the cup casing 12 of the milking cup 5 form a rigid unit here. However, it should be noted that this is not necessary for the invention. For example, the milking cup and the housing may be separated by a short section of milk hose, so that, for example, it is more readily possible to ensure that the measuring chamber 6 will always hang substantially vertically during milking. Nevertheless, the direct connection according to FIG. 2 offers the advantage of a more direct measurement of milk from the dairy animal.

The obtained milk is (temporarily) collected in the measuring chamber 6, wherein the milk level will rise at the start of the milking. The level of the milk 20 in the measuring chamber 6 may be measured using a level sensor 26. In the illustrated embodiment, this comprises a bottom electrode 27 and a series of electrodes 28 which extend over the height of the measuring chamber 6. The highest electrode 28 which, with the bottom electrode 27, exhibits a conductance which is greater than a threshold value indicates the level of the milk 20.

The level sensor 26 is in operational connection with the control unit 9 (not shown here) and transmits a signal related to the measured milk height. The control unit 9 is also connected to the adjustable valve 8. The size of the passage opening of the valve 8 is determined by the control unit on the basis of the measured milk level. If the milk level in the measuring chamber 6 rises, at least to above a desired value, then the milk flow has evidently increased. In order to compensate for this by means of a milk outflow of an (approximately) equal size through the second milk outflow opening 25, the control unit will open the valve 8 further. By contrast, if the milk level falls, the control unit will close the valve further. This achieves a milk level in the measuring chamber 6 which is substantially as constant as possible.

An advantage of this, for example, is that the measurement constricted section 23 connected to the measuring chamber 6 and the second milk outflow opening 25 can always be kept entirely submerged in milk but also continuously flowed through by fresh milk. A very reliable measurement of milk properties can thus be ensured. To this end, for example, an additional sensor 24 is provided on the measurement constricted section 23. This additional sensor comprises, for example, an optical sensor, with a light source on one side of the measurement constricted section and a photodiode or the like on the opposite side of the measurement constricted section. The sensor 24 then measures, for example, the transmittance for one or more colours, on the basis of which it is possible to reach a conclusion about the composition of the milk, such as fat content or, for example, milk containing blood. The sensor may be connected to the control unit 9, so that the control unit 9 can adjust one or more settings of the milking system 1 on the basis of the measured value from the additional sensor 24.

Incidentally, additional sensors other than the described optical sensor are also possible, such as conductivity sensors and the like. The level sensor 26 may also be of a different type than the described type with the stacked electrodes, and may, for example, be a sensor which operates on the basis of optical transmittance of the measuring chamber 6.

In this case, the measurement constricted section 23 is, for example, a narrowed part of the measuring chamber, with two (approximately) parallel walls which may be permeable to light or other radiation or fields.

The level sensor 26 may sometimes measure an incorrect height of the milk 20 in the measuring chamber 6, for example if the level sensor 26 is located along a wall of the measuring chamber 6 and said wall is at an angle to the vertical, such as when attaching the milking cup 5 to a slanted teat. In order to correct for this, it is possible to use an inclination sensor, such as the camera 11 from FIG. 1. This can ascertain whether the milking cup with the housing 17 of the measuring chamber 6 is at an angle from the vertical and, if so, can ascertain this angle using image-processing software suitable for this purpose. The angle thus obtained can be transmitted to the control unit 9 which can use this to determine the correct height of the milk in the measuring chamber 6 according to simple geometric formulas.

An important variable during milking is the milk flow. The milk flow can be determined in a very simple way on the basis of the height of the milk 20 in the measuring chamber 6 and the size of the passage opening of the valve 8. Where the conditions remain otherwise unchanged, in particular the pressure difference between the vacuum in the top part of the measuring chamber 6, in other words in the vacuum line 22, and the vacuum which prevails in order to discharge the milk through the milk hose 7, the milk flow can be simply calculated using hydrostatic equations. Thus, the control unit 9 from FIG. 1, together with the level sensor 26 and the valve 8, could serve as a milk flow meter. In this case, it is assumed that the liquid in the measuring chamber is not a milk/air mixture but substantially pure milk, which is an advantage achieved according to the invention. Nevertheless, it is also possible, in addition to the alternative of calibration measurements, to make this calculation of the milk flow more reliable. To this end, for example, the vacuum sensor 29 may be provided, shown here in the vacuum line 22, but it may also be provided in, for example, the top part of the measuring chamber 6. The (milk) vacuum prevailing there, and also the prevailing milk transport vacuum, which is determined by the milking system and can likewise be measured further along the milk hose, determine, together with the height of the milk column, the pressure difference over the passage opening of the valve 8, and thus the volume of the milk flow.

Another variable which can influence the calculation of the milk flow is the height of the milk column above the valve 8. In the diagrammatic representation of FIG. 2, this will be approximately constant, independently of the height at which the milking cup 5 is attached to a teat. However, as the valve 8 may also be located much further along the milk hose 7, for example a meter or more, it may be the case that the height of the milk column above the valve can vary greatly depending on the height of the teats of the dairy animal. In order to be able to take into account this height, it may be advantageous to use, for example, the camera 11 from FIG. 1 to determine the height of the milking cup and/or of the valve 8. From the height difference, it is in particular possible to determine a difference in height of the milk column, which fills the measuring chamber up to and including the part of the milk hose 7 up to the valve 8. It should be noted here that the teat height is a property of the animal, which may also be stored and searched for in the control unit 9 of the milking system. In this case, it is assumed that the resulting position and form of the milk hose, and thus the height difference between the measuring chamber 6 and the valve 8, is substantially constant during each milking operation of said dairy animal. In this case, other measurement methods and sensors for determining and taking into account this height difference are not ruled out.

It is also possible to provide an additional milk flow meter, in particular a milk hose milk flow meter 10. In FIG. 2, this is located downstream of the valve 8, but could also be between the measuring chamber 6 and the valve 8. As the milk flow is a single-phase system at the location of the milk hose milk flow meter 10, a great variety of different meters may be used, in particular including very simple and reliable meters. An example of this is a milk flow meter on the basis of the magnetohydrodynamic principle, which has the advantage that it can measure the milk flow in an entirely contactless manner.

Figure 3A:
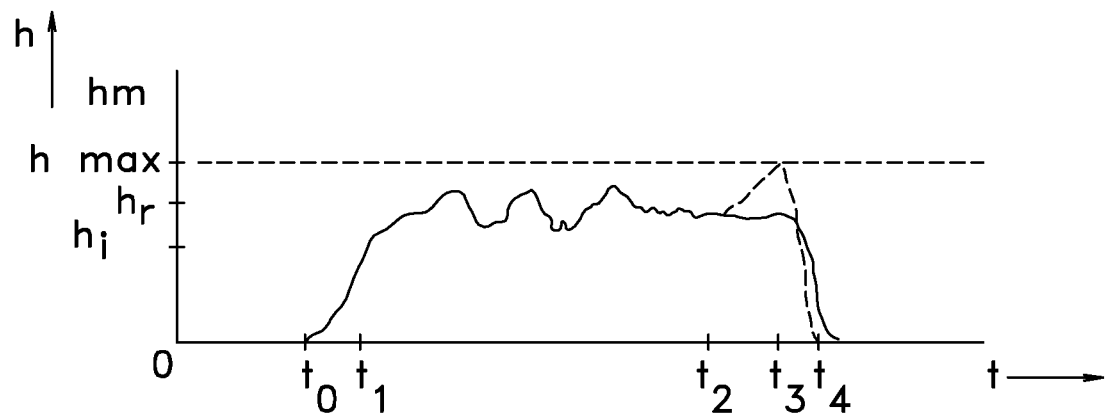
FIGS. 3A and 3B show diagrammatic exemplary views of the milk level and the size of the passage opening of the valve, respectively, during use of the milking system according to the invention.
Figure 3B:
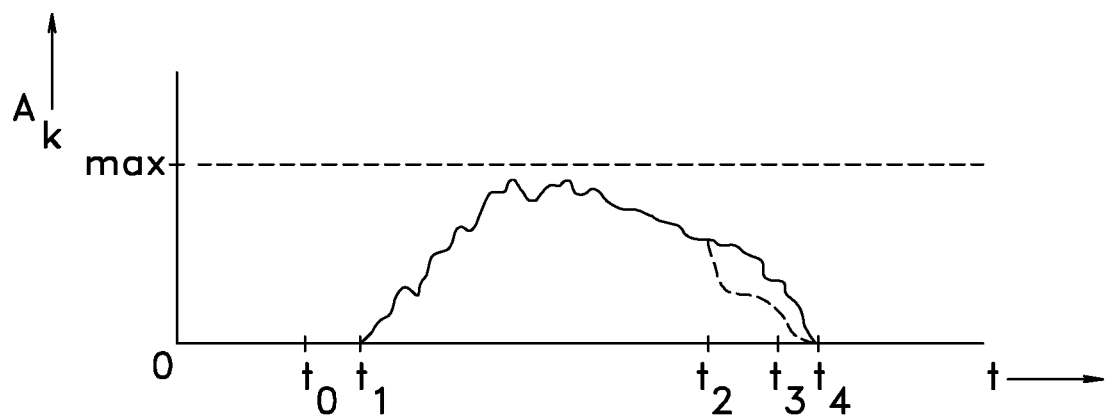

FIGS. 3A and 3B show diagrammatic views with a milk level and a size of the passage opening of the valve 8 over time. FIG. 3A shows how the milk level H can vary over time during the milking operation of a dairy animal. At $T_0$, milk enters the measuring chamber and the valve is still closed. Accordingly, the milk level H will begin to rise. At time $t_1$, the height Hi, being the minimum height, is reached. At that moment, the control unit decides to already open the valve 8 by a small amount in order to prevent the milk level from rising too far. The milk level continues to rise until $H_r$, the control height at which the control unit aims to keep the level constant. Meanwhile, the control unit continues to adjust the position of the valve, and thus the size of the passage opening, in order to keep the milk level constant. In this case, it is best to ensure that the maximum passage opening of the valve is so large that it is in principle sufficient to keep the milk level below the permitted maximum (full measuring chamber). Toward the end of the milking operation, when the main milking phase with a high and approximately constant milk flow transitions into the post-milking phase, with a slowly decreasing milk flow, the control unit will start to reduce the passage opening $A_k$ in order to keep the milk level as constant as possible. This is illustrated in FIGS. 3A and 3B by the fall in the value of $A_k$. The milk level H then remains approximately constant also after time $t_2$, until approximately time $t_3$ at which the milk flow has become too low to keep the milk level H at the desired level. After time $t_3$, this milk level will therefore fall rapidly until the end of the milking operation at time $t_4$.

However, it is also possible to deal with the decreasing milk flow in another way. This is illustrated using the dashed line in FIGS. 3A and 3B. As soon as the milk flow falls below a predetermined threshold, which may optionally be made animal-dependent, there is an increased chance of so-called creeping of the milking cup, in which the milking cup moves upward along the teat and may potentially cut off blood vessels, with it also being possible that the milk duct in the teat becomes squeezed shut. In order to counteract this, it is sometimes advantageous if the milking cup pulls on the teat with a higher than average force. This may be achieved, for example, by increasing the milk level. The extra weight then pulls slightly more on the teat. This may in turn be achieved by reducing the passage opening $A_{ak}$ of the valve faster than in the situation described above. FIG. 3B shows that the valve is already being closed in an accelerated manner at time $t_2$, as a result of which the milk level H will rise to the permitted maximum $H_{max}$. It is thus possible to enable a more efficient milking of the teat.

The embodiments shown only serve to illustrate the invention, without limiting it. The scope of protection is defined by means of the attached claims.

The invention claimed is:

1. A milking system for milking a dairy animal, comprising:
   at least one milking cup having a first milk outflow opening,
   a measuring chamber having a milk inlet which is in flow communication with the first milk outflow opening, with a second milk outflow opening to a milk hose, and with a vacuum connection,
   a level sensor for measuring a milk level in the measuring chamber,
   a controllable valve having an adjustable passage opening, which is provided in or downstream of the second milk outflow opening, and
   a control unit which is operatively connected to the level sensor and the valve, and which is configured to adjust the passage opening of the valve on a basis of the measured milk level,
   wherein the control unit is configured to adjust the passage opening between a smallest open position and a largest open position during at least a part of a milking operation.

2. The milking system as claimed in claim 1, wherein the measuring chamber is directly and rigidly connected to the milking cup.

3. The milking system as claimed in claim 2, wherein the milking cup and the measuring chamber form one rigid unit.

4. The milking system as claimed in claim 1, wherein the control unit is configured to enlarge the passage opening in the case of a rising milk level and reduce the passage opening in the case of a falling milk level.

5. The milking system as claimed in claim 4, wherein the control unit is configured to adjust the passage opening in such a way that the aim is a milk level which remains the same.

6. The milking system as claimed in claim 1, wherein the level sensor extends substantially vertically over an internal height of the measuring chamber during milking.

7. The milking system as claimed in claim 1, further comprising an inclination sensor for determining an inclination of the milking cup, wherein the control unit is operatively connected to the inclination sensor and is configured to correct the measured milk level on a basis of the determined inclination.

8. The milking system as claimed in claim 1, wherein the valve is provided in the measuring chamber.

9. The milking system as claimed in claim 8, wherein the valve is provided in the second milk outflow opening.

10. The milking system as claimed in claim 1, further comprising a milk flow meter which is configured to determine a milk flow through the second milk outflow opening on a basis of the passage opening of the valve.

11. The milking system as claimed in claim 10, further comprising a pressure measuring device configured to measure a pressure difference over the valve and/or the passage opening.

12. The milking system as claimed in claim 11, wherein the pressure measuring device comprises a first pressure sensor configured to measure a pressure in the measuring chamber, and a second pressure sensor to measure a pressure in the milk hose.

13. The milking system as claimed in claim 10, further comprising a height determining device configured to determine a milking height at which the measuring chamber is located during milking of the dairy animal, and wherein the milk flow meter is operatively connected to the height determining device and is configured to determine the milk flow on a basis of the determined milking height.

14. The milking system as claimed in claim 13, wherein the height determining device is configured to determine a valve height at which the valve is located during milking, and wherein the milk flow meter is configured to determine the milk flow on a basis of the valve height.

15. The milking system as claimed in claim 1, comprising a milk hose milk flow meter in or around the milk hose for measuring the milk flow.

16. The milking system as claimed in claim 15, wherein the milk hose milk flow meter is a contactlessly measuring electrically or electromagnetically operated milk hose milk flow meter.

17. The milking system as claimed in claim 1, wherein the measuring chamber has a rounded cross section that increases away from the milk inlet.

18. The milking system as claimed in claim 1, comprising an additional sensor for measuring a milk-related property.

19. The milking system as claimed in claim 10, wherein the control unit is configured to control the valve in such a way that the milk level increases if the determined milk flow falls below a threshold value.

20. The milking system as claimed in claim 1, wherein the control unit is configured to continuously adjust the passage opening between a smallest open position and a largest open position during a main milking phase of the milking operation.

21. The milking system as claimed in claim 1, wherein the level sensor comprises a series of mutually separate electrodes which are electrically connectable via a sensor control unit.

22. The milking system as claimed in claim 1, wherein the control unit is configured to set at least one position of the passage opening between a smallest open position and a largest open position during a main milking phase of the milking operation.

* * * * *